(12) United States Patent
Härdtle

(10) Patent No.: US 7,032,730 B2
(45) Date of Patent: Apr. 25, 2006

(54) GEARBOX WITH CENTRAL CLUTCH RELEASE

(75) Inventor: Wilhelm Härdtle, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/181,121

(22) PCT Filed: Jan. 30, 2001

(86) PCT No.: PCT/EP01/00966

§ 371 (c)(1),
(2), (4) Date: Jul. 11, 2002

(87) PCT Pub. No.: WO01/57419

PCT Pub. Date: Aug. 9, 2001

(65) Prior Publication Data

US 2003/0010590 A1    Jan. 16, 2003

(30) Foreign Application Priority Data

Feb. 4, 2000  (DE)  ................. 100 05 086

(51) Int. Cl.
*B60K 41/22*  (2006.01)
(52) U.S. Cl. ................... 192/3.58; 192/91 A
(58) Field of Classification Search ............ 192/3.3, 192/85 CA, 91 A, 91 R, 3.58, 85 C; 74/336 R
See application file for complete search history.

(56) References Cited

U.S. PATENT DOCUMENTS

| | | | |
|---|---|---|---|
| 3,876,028 A * | 4/1975 | Asano et al. .......... 192/3.57 |
| 4,271,728 A | 6/1981 | Wakamatsu | |
| 4,684,003 A * | 8/1987 | Leigh-Monstevens .. 192/85 CA |
| 5,004,086 A | 4/1991 | Petzold et al. .......... 192/85 C |
| 5,267,637 A * | 12/1993 | Wilbur et al. ........... 192/85 CA |
| 5,508,916 A * | 4/1996 | Markyvech et al. .......... 477/86 |
| 5,513,732 A * | 5/1996 | Goates ...................... 192/3.3 |
| 5,722,519 A * | 3/1998 | Kirchhoffer et al. ......... 192/3.3 |
| 5,878,630 A | 3/1999 | Fessler et al. ........... 74/606 A |
| 5,934,427 A * | 8/1999 | Takagi ...................... 192/3.3 |
| 6,015,031 A | 1/2000 | Dorfschmid et al. ....... 192/3.58 |
| 6,116,391 A * | 9/2000 | Kremmling et al. ....... 192/3.58 |
| 6,116,399 A | 9/2000 | Drexl et al. | |
| 6,205,887 B1 * | 3/2001 | Barnreiter et al. ........ 74/606 R |
| 6,230,862 B1 | 5/2001 | Reik et al. ............... 192/3.56 |

FOREIGN PATENT DOCUMENTS

| | | |
|---|---|---|
| DE | 1 132 810 | 1/1963 |
| DE | 41 20 540 C1 | 11/1992 |
| DE | G93 07 228.7 | 8/1993 |
| DE | 196 27 980 A1 | 1/1997 |
| DE | 197 16 600 A1 | 12/1997 |
| DE | 197 29 096 A1 | 9/1998 |
| DE | 198 15 666 A1 | 11/1998 |
| DE | 197 35 759 A1 | 2/1999 |
| DE | 198 32 015 A1 | 2/1999 |
| DE | 198 26 068 A1 | 12/1999 |
| EP | 0 371 975 B1 | 4/1992 |
| EP | 0 824 644 B1 | 9/1998 |
| WO | WO 97/10456 A2 * | 3/1997 |

* cited by examiner

*Primary Examiner*—Rodney H. Bonck
(74) *Attorney, Agent, or Firm*—Davis & Bujold, P.L.L.C.

(57) ABSTRACT

A vehicle gearbox (2) comprises a centrally operating device (28) for releasing the clutch (6), which is provided between the clutch disc and the clutch bell housing of the gearbox (2). A transmission control unit (22) provided on or in the gearbox (2) is both electrically connected directly with the device (28) and the medium for actuating the clutch (6) is received directly from the transmission control unit (22).

7 Claims, 2 Drawing Sheets

GEARBOX WITH CENTRAL CLUTCH RELEASE

FIELD OF THE INVENTION

The invention concerns a gearbox with a central clutch release.

BACKGROUND OF THE INVENTION

The clutch release of gearboxes can be effected by virtue of clutch actuators arranged externally on the clutch bell housing or by means of clutch release mechanisms arranged centrally on the input shaft of the gearbox. In the latter variant there is no need to provide a transmission lever between the clutch and the clutch actuator. This lever amplifies the force produced by the clutch actuator to the force required at the clutch in order to disengage the clutch disc from the flywheel between the drive motor and the gearbox.

From European patent specification EP 0 371 975 a clutch release system is known, in which an actuation cylinder, magnetic valves and a path measurement device are provided in a clutch actuator not located centrally. The clutch release system comprises only one external connection for the actuation medium and one external connection for electrical leads. In this clutch release system it is necessary to provide both an additional lead to the clutch control device and an additional line for the supply of the actuation medium. There must also be a lever mechanism between the clutch actuator and the clutch.

German application DE 198 26 068.7 describes a central clutch release system in which an actuation cylinder for the actuation medium and a path measurement device are arranged centrally around the input shaft of the gearbox. The valves are arranged outside the gearbox and have to be connected with the actuation cylinder by means of a corresponding connection line. An electrical lead must also be provided for the connection between the path measurement device and a clutch control unit.

From European patent specification EP 0 824 644 a transmission control system for vehicle transmissions is known, which is arranged on or in the gearbox and co-operates with control elements of the gear-shift mechanisms. The transmission control system comprises both mechanical and electronic elements. The transmission control system does not co-operate with a clutch release or clutch control unit.

Beginning from the said state of the prior art, the purpose of the present invention is to propose a centrally operating clutch release system for a gearbox which eliminates the existing disadvantages.

The objective is achieved by a clutch release system having the characteristics of claim 1. Its design features are the object of the subordinate claims.

SUMMARY OF THE INVENTION

According to the invention a centrally operating device for releasing the clutch is proposed, which is arranged between the clutch disc and the clutch bell housing in such manner that the connection line for the actuation medium and the electrical connection lead for the clutch control system can be connected directly to the transmission control unit. The clutch actuation medium is taken directly from the transmission control unit. The medium is preferably air because in commercial vehicles air is available as an actuation medium, for example for the brakes.

In an advantageous embodiment the outer diameter of the clutch release device extends as far as the transmission control unit. One design form comprises plug-in connectors on the clutch release device and on the transmission control unit, which can be connected directly to one another. In an advantageous embodiment the clutch control system is integrated into the clutch release device, and in a design form the magnetic valves that actuate the clutch release mechanism are also provided in the clutch release device. A further embodiment has the clutch control system integrated in the transmission control unit, and in one form the magnetic valves that actuate the clutch release mechanism are also provided in the transmission control unit.

Because of the arrangement of the clutch release device in direct connection with the transmission control unit, only one connection for the transmission control and clutch actuation medium is needed, which can be provided directly on the transmission control unit. Likewise, only one plug connector need be provided on the transmission control unit, by means of which both the transmission control unit and the clutch control system can be reached and can for example engage with a common BUS, for example a CAN-BUS. Locating the clutch release device inside the clutch bell housing saves the space occupied by the previous arrangement outside on the gearbox, which can now be used for other purposes or can provide the vehicle designer with more freedom of design. Simple detachable connection by means of plug-in connectors allows a modular structure of the mechanical gearbox portion, the clutch release mechanism and the transmission control unit. The short length of the connections between the transmission control unit and the clutch release device results in responsive dynamics in the control of the clutch.

The device described is suitable for both push and pull-type clutch disengagement. In this, the clutch is preferably a dry clutch although if appropriate sealing is provided it can also be used with a fluid clutch.

BRIEF DESCRIPTION OF THE DRAWINGS

The ivention will now e described, by way of example, with reference to the accompanying drawings in which.

DETAILED DESCRIPTION OF THE INVENTION

Figure 1:
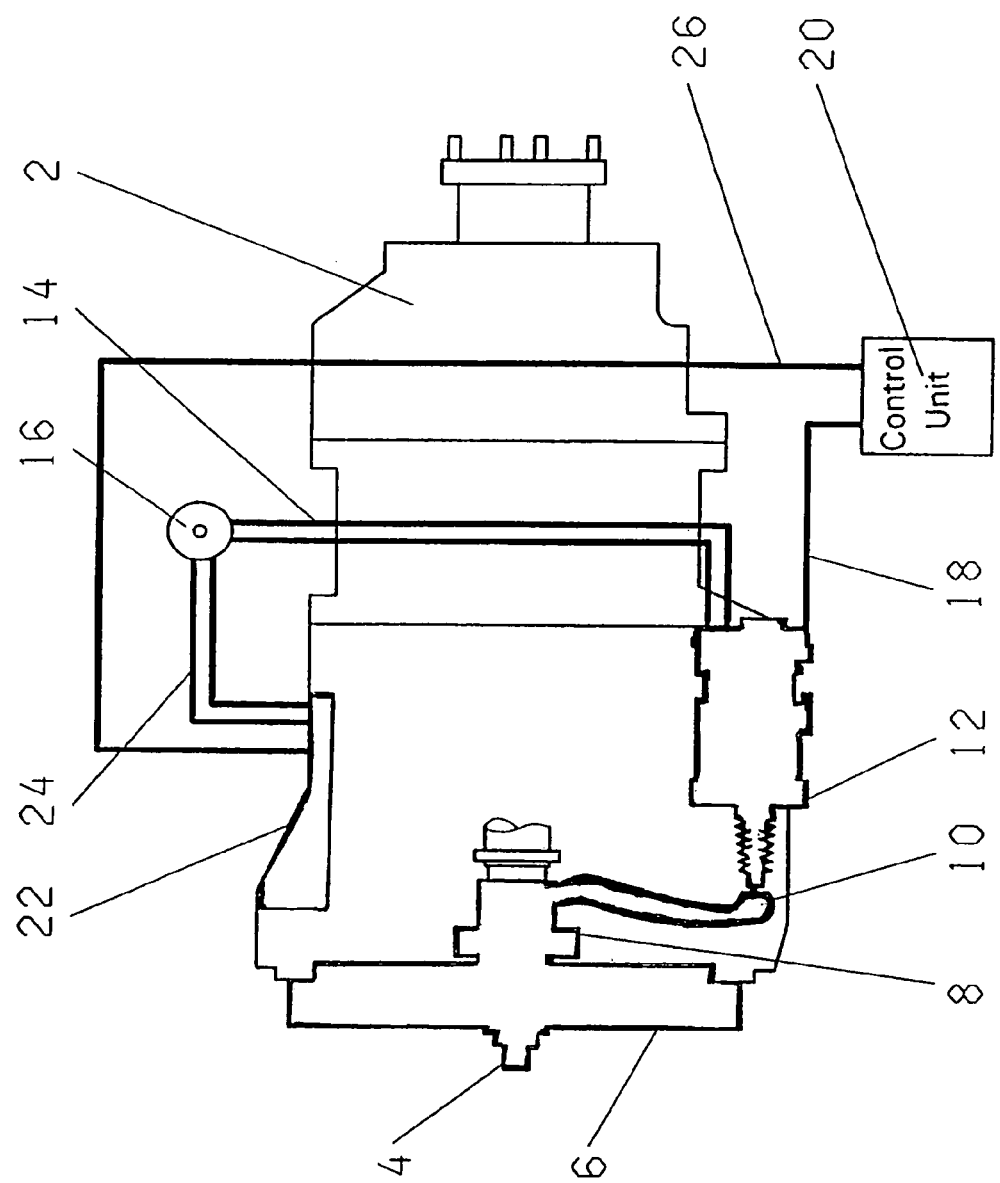
FIG. 1 is an arrangement according to the prior art.

FIG. 1 shows a gearbox 2 for a vehicle (not shown here). On the input shaft 4 of the gearbox 2 is arranged a clutch 6, which can be moved by a clutch release bearing 8 to an open condition and to a closed condition with respect to the flywheel of a drive motor of the vehicle (not shown here). On the release bearing 8 there acts a lever 10 which is operated by a clutch actuator 12. On the clutch actuator 12 is provided a connection line 14 which connects the clutch actuator 12 with a reservoir 16 for the clutch actuation medium. An electrical lead 18 connects the clutch actuator 12 to an electronic control unit 20. This control unit 20 may even be the control computer of the vehicle. In the gearbox 2 is arranged a transmission control unit 22 which is also connected to the reservoir 16 via a line 24 and to the control unit 20 via a lead 26.

Figure 2:
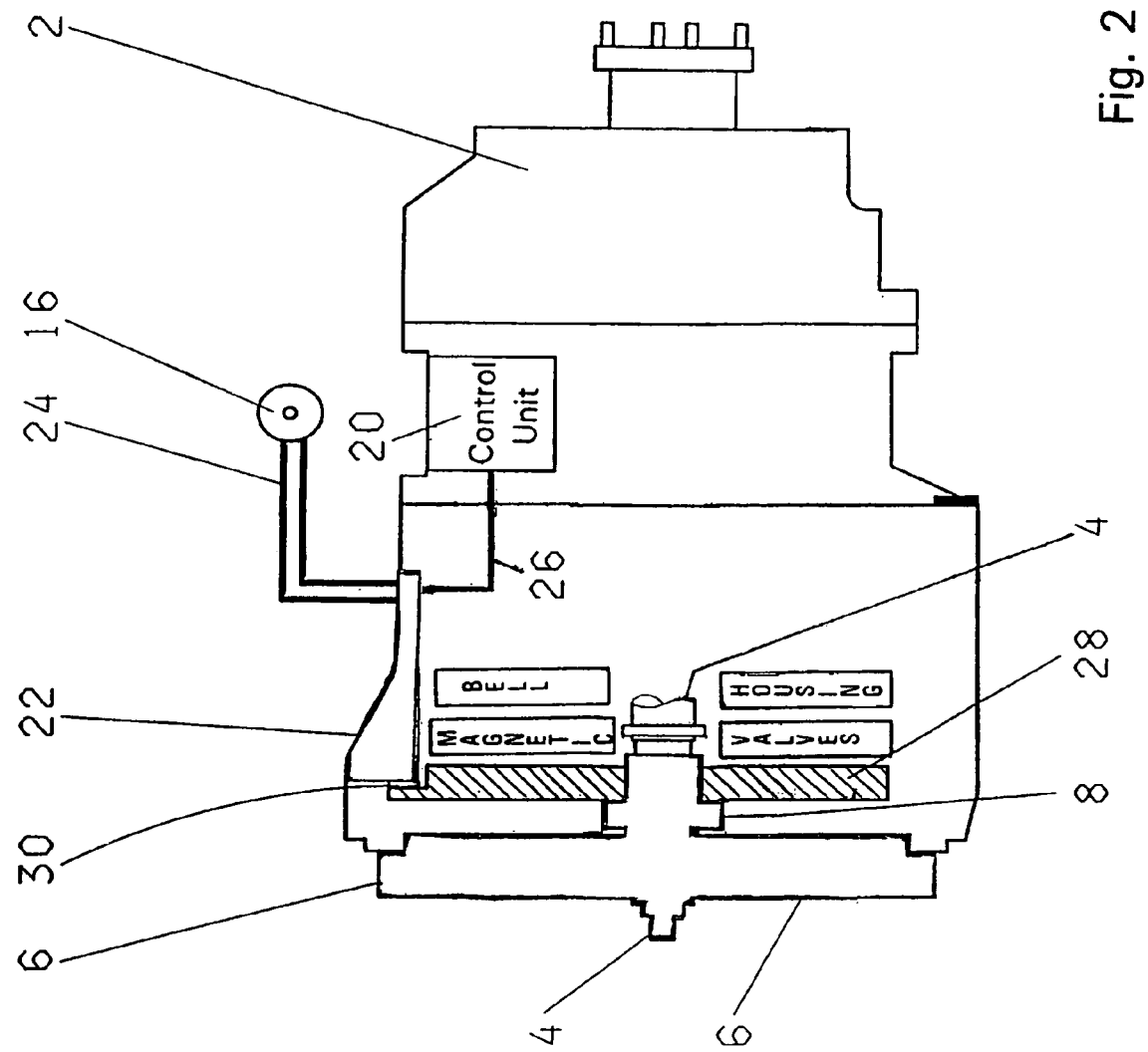
FIG. 2 is an arrangement according to th invention.

FIG. 2 shows a gearbox 2 for a vehicle (again not shown). On the input shaft 4 of the gearbox 2 is arranged the clutch 6, which can be moved to an open and a closed condition by the release bearing 8 arranged on the input shaft 4. The release bearing 8 is acted upon by a clutch release device 28 which is arranged around the input shaft 4 and between the between the clutch disc and the clutch bell housing (34) for facilitating control of the clutch 6. On its outer circumference the device 28 has mating plug-in connectors, by means of which the device 28 and the transmission control unit 22 can be connected to one another. In FIG. 2, the connection between the device 28 and transmission control unit 22 is by mating connectors 30, which are only diagrammatically shown. The plug-in connectors may be plugs and couplings appropriately sealed for the actuation medium, of the type generally known for pipelines from the field of pneumatics. The plug connection for electrical transfer preferably consists of a round, multi-pole plug-in connector, whose halves can be screwed together to secure them. Via these plug connections the device 28 receives the necessary electric signals and the auxiliary medium for actuating and releasing the clutch.

In an advantageous embodiment the clutch control system is integrated into the clutch release device 28, and in a design form the magnetic valves 32 that actuate the clutch release mechanism 28 are also provided in the clutch release device 28. A further embodiment has the clutch control system integrated in the transmission control unit 22, and in one form the magnetic valves 32 that actuate the clutch release mechanism 28 are also provided in the transmission control unit 22.

Because of the arrangement of the clutch release device 28 in direct connection with the transmission control unit 22, only one connection 30 for the transmission control 22 and clutch actuation medium is needed, which can be provided directly on the transmission control unit 22. Likewise, only one plug connector 30 need be provided on the transmission control unit 22, by means of which both the transmission control unit 22 and the clutch control system can be reached and can for example engage with a common BUS, for example a CAN-BUS. Locating the clutch release device 28 inside the clutch bell housing 34 saves the space occupied by the previous arrangement outside on the gearbox 2, which can now be used for other purposes or can provide the vehicle designer with more freedom of design. Simple detachable connection by means of plug-in connectors allows a modular structure of the mechanical gearbox portion, the clutch release mechanism 28 and the transmission control unit 22. The short length of the connections between the transmission control unit 22 and the clutch release device 28 results in responsive dynamics in the control of the clutch.

| Reference numbers |
| --- |
| 2 Gearbox |
| 4 Input shaft |
| 6 Clutch |
| 8 Release bearing |
| 10 Lever |
| 12 Clutch actuator |
| 14 Connection line |
| 16 Reservoir |
| 18 Connection lead |
| 20 Control unit |
| 22 Transmission control unit |
| 24 Connection line |
| 26 Connection lead |
| 28 Device |
| 30 Plug connector |

The invention claimed is:

1. A vehicle gearbox (2) comprising:
a clutch (6) having a clutch disc and a clutch bell housing (34);
a central clutch release device (28) being centrally located around an input shaft (4) and situated between the clutch disc and the clutch bell housing (34) for facilitating control of the clutch;
the gearbox (2) having a transmission control unit (22) connected directly with the central clutch release device (28); and
the clutch (6) being actuated solely by pressure medium obtained directly from the transmission control unit (22);
wherein the transmission control unit (22) is located one of on or within the gearbox (2), the central clutch release device (28) has an outer circumference extending to an inner circumference of the clutch bell housing for direct connection of the clutch release device (28) through the clutch bell housing and to the transmission control unit (22); and
valves (32) for controlling release of the clutch (6) are integrated into one of the central clutch release device (28) and the transmission control unit (22) thereby providing a direct connection between the transmission control unit (22) and the valves (32) and clutch release device (28) for controlling release of the clutch (6).

2. The vehicle gearbox (2) according to claim 1, wherein a plug-in connector (30) is provided on the outer circumference of the central clutch release device (28) to facilitate direct connection between the central clutch release device (28) and the transmission control unit (22).

3. The vehicle gearbox (2) according to claim 1, wherein a control system for the clutch (6) is integrated in the central clutch release device (28).

4. The vehicle gearbox (2) according to claim 1, wherein the valves for controlling release of the clutch (6) are magnetic valves.

5. The vehicle gearbox (2) according to claim 1, wherein a control system for the central clutch release device(28) is integrated in the transmission control unit (22).

6. The vehicle gearbox (2) according to claim 1, wherein the medium for actuating the clutch (6) is air.

7. A vehicle transmission (2) with a central clutch release device (28) for facilitating actuation of the clutch (6), the central clutch release device (28) being arranged between a clutch disk and a clutch bell housing of the transmission (2) and linked to a transmission control unit (22) supported by the transmission (2),
wherein the transmission control unit (22) is located one of on or within the transmission (2), the central clutch release device (28) has an outer circumference extending to an inner circumference of the clutch bell housing for direct connection of the clutch release device (28) to the transmission control unit (22), and
the clutch (6) is solely actuated by an actuating medium supplied directly from the transmission control unit (22) to the clutch release device (28); and
valves (32) for controlling release of the clutch (6) are integrated into one of the central clutch release device (28) and the transmission control unit (22) thereby providing a direct connection between the transmission control unit (22) and the valves (32) and clutch release device (28) for controlling release of the clutch (6).

* * * * *